Figure 1:
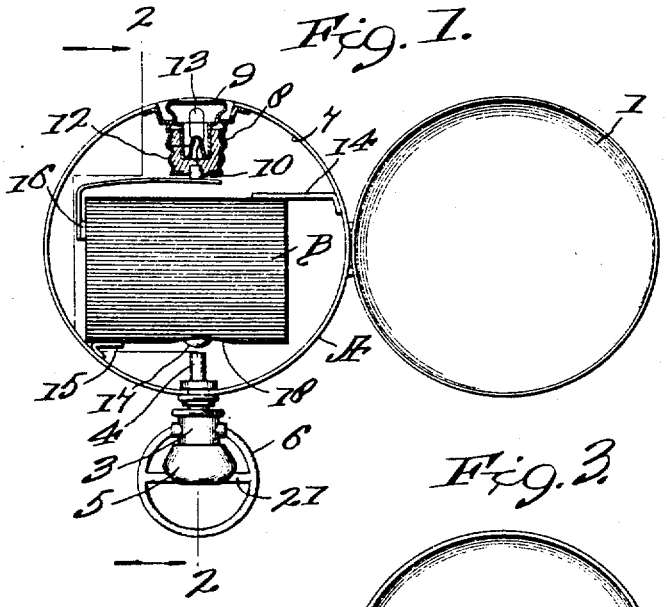

362-206 SR
XR RE 14,088

H. M. KORETZKY.

FLASH LIGHT.

APPLICATION FILED FEB. 7, 1916.

Reissued Mar. 14, 1916.

Re 14,088.

Witnesses
Edwin J. Beller.
P. J. Mawhinney.

Inventor
H. M. Koretzky,
by
Williamson, Cluett & McKey,
Attorneys

THE COLUMBIA PLANOGRAPH CO., WASHINGTON, D. C.

10.6

UNITED STATES PATENT OFFICE.

HARRY M. KORETZKY, OF NEW YORK, N. Y.

FLASH-LIGHT.

14,088. Specification of Reissued Letters Patent. Reissued Mar. 14, 1916.

Original No. 1,155,249, dated September 28, 1915, Serial No. 5,039. Application for reissue filed February 7, 1916. Serial No. 76,797.

*To all whom it may concern:*

Be it known that I, HARRY M. KORETZKY, a citizen of the United States of America, and a resident of the city of New York, borough of the Bronx, in the county of the Bronx and State of New York, have invented a new and Improved Flash-Light, of which the following is a full, clear, and exact description.

This invention relates to flash lights of that type adapted to be carried in the pocket so as to be always conveniently available for use, and the invention has for its general objects to provide a flash light in the form of a novelty, in that it simulates a watch, pedometer, ammeter, voltmeter and other watch shaped instruments, the case of the device serving not as a housing for the usual apparatus embodied in the instruments above referred to, but an electric cell, lamp and circuit contacts are arranged in the casing, so that by the pushing of a button the lamp can be lighted.

A further object of the invention is to provide a novel arrangement of lamp, push-button contacts and cell within the narrow compass of an ordinary watch case, and at the same time provide a cell of considerable capacity compared with the available space for its storage.

A further object of the invention is the provision of a push-button switch which takes the form of the stem of the watch or instrument the device simulates, and by the pushing of the stem the circuit of the lamp is completed, and if it is desired to maintain the circuit completed for a considerable length of time the usual ring of the watch or other instrument can be so engaged with the knob of the stem as to keep the latter pressed in a closed circuit position.

Still another object of the invention is the provision of an electric lamp within the casing and normally concealed when the cover of the casing is closed, and which is adapted to be automatically lighted when the stem of the device is pressed in to unlock the cover, which latter springs open just like the cover of a watch, such a device affording amusement, in that when the person carrying the watch is asked the time he may take out the device, and pretend to open it as an ordinary watch is opened, and instead of a timepiece being revealed, a light will flash. Besides being used as a novelty the device can perform the usual service of a flash light.

With such objects in view, and others which will appear as the description proceeds, the invention comprises various novel features of construction and arrangement of parts which will be set forth with particularity in the following description and claims appended hereto.

Figure 2:
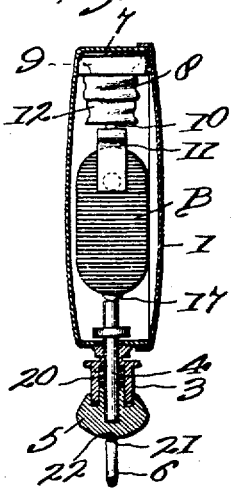
Figure 3:
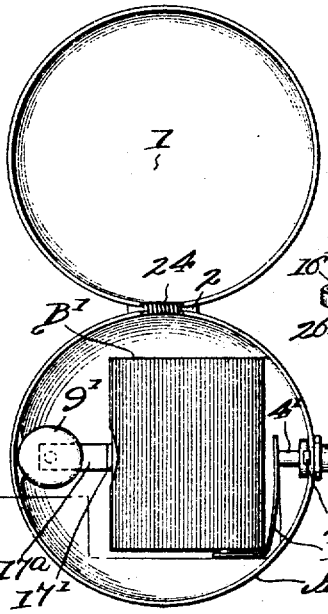
Figure 5:
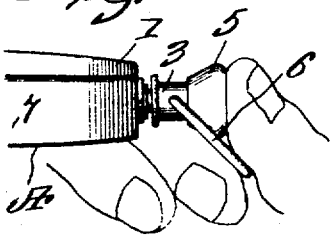
Figure 6:
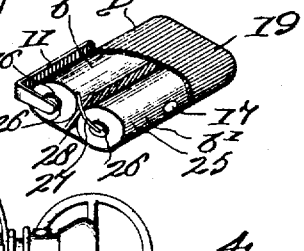
Figure 4:
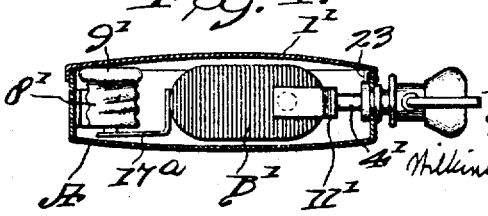

In the accompanying drawing, which illustrates certain embodiments of the invention and wherein similar characters of reference indicate corresponding parts in all the views, Figure 1 is a plan view of the flash light novelty in the form of a closed watch, the cover of the watch being open to show the internal arrangement; Fig. 2 is a section on the line 2—2, Fig. 1; Fig. 3 is a view of a modified form, wherein the cover automatically springs open when the stem of the device is pressed; Fig. 4 is a section on the line 4—4, Fig. 3; Fig. 5 is an edge view of the watch, showing the manner in which the same is held to operate the push-button; and Fig. 6 is a perspective view of the dry cell.

Referring to the drawing, A designates a casing which in size and shape resembles an ordinary watch, and this casing is provided with a suitable cover 1, preferably, although not necessarily, fastened to the casing A by a hinge 2. Attached to the casing is a barrel 3 in which is a slidable stem 4, and on the stem is a knob 5, and on the barrel is a pivoted ring 6. These parts 3, 4, 5 and 6 are of the same appearance as the stem construction of a watch, so that in its external aspect the article simulates a watch, or any other instrument of the pocket type.

The casing A and cover 1 constitutes the body of an electric flash light, and the circular wall 7 of the casing has a threaded socket 8 for receiving a small electric lamp 9 which screws into the socket, the base of the lamp having a central contact 10 which is adapted to engage a spring contact 11, and also having a threaded shell contact 12 which is grounded on the casing A, which is of metal, and the filament 13 of the lamp has its terminals connected with the contacts 10 and 12. The bulb of the lamp is preferably flush with the circular wall of the casing so as not to be liable to injury. The current is furnished by a dry cell B made up of units suitably bound together in the usual manner. The lamp is diametrically opposite from the stem 4, and the cell is disposed intermediate the stem and the lamp, and the greatest length of the cell is transverse to the diametrical line in which the stem and lamp are located. By this arrangement a cell of maximum capacity is provided for the available space within the casing A. To prevent shifting of the cell, stops or abutments 14 and 15 are arranged in the casing, as clearly shown in Fig. 1. The terminal 16 of the cell has soldered or otherwise secured thereto the spring contact 11, which latter is an L-shaped strip of metal projecting laterally from the terminal 16, and thence along the side of the cell. The other terminal 17 of the cell is provided by cutting an opening 18 in the paper cover 19 of the cell and applying a drop of solder to the metal surface exposed by making the opening 18. This drop of solder or terminal 17 is directly in line with the inner end of the stem 4, so that by pushing the stem inwardly the circuit of the cell and lamp is completed. The barrel 3 is hollow and contains a spring 20 which presses on the knob 5 to which the stem 4 is fastened and consequently by pressing the knob 5 inwardly the circuit is completed. A convenient method of holding the flash light and operating the push button switch is shown in Fig. 5, where the ring 6 is grasped between the thumb and first finger while the thumb is pressing on the knob or push button 5.

If it is desired to maintain a permanent light the push-button can be held pressed by engaging a cross-bar 21 on the ring 6 with a notch 22 in the knob 5, as clearly shown in Fig. 2.

In the construction shown in Figs. 3 and 4 the lamp 9′ is normally concealed within the casing A of the device, and this lamp is screwed into a socket 8′ which is fastened to and electrically connected with the casing A. The cell B′ is arranged in the casing reversely to the arrangement of Fig. 1 and the spring contact 11′ is in engagement with the stem 4, and the terminal 17′ has a laterally extending L-shaped contact strip 17 which extends under the socket 8′ and engages the central contact of the lamp 9′, as clearly shown in Fig. 4. The cover 1′ is adapted to be held closed by a catch 23 on the stem 4′, and by pressing the stem inwardly the catch is released, so that the cover 1′ will fly open, due to a spring 24 incorporated in the hinge 2′ between the cover and casing. Normally the stem 4′ is separated from the contact 11′, and when the stem is pressed inwardly the cover will spring open and the lamp will be simultaneously lighted.

The construction of the cell is shown in Fig. 6. The two units *b* and *b′* each comprise a metal casing 25 which forms one electrode and contains the active material, and centrally disposed within this cylinder 25 is the other electrode 26. The electrode 26 of one unit is connected by a wire 27 with the cylinder of the adjacent unit, the two units being separated by a strip of insulation 28, and the covering 19 serving to hold the units together. The other electrode 26 forms the terminal 16 to which the spring contact 11 is connected.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device is merely illustrative and that such changes may be made when desired as are within the scope of the appended claims.

Having thus described my invention, I claim as new and desire to secure by Letters Patent:

1. A flash light comprising a circular metallic casing, a rectangular battery disposed in the casing, a lamp disposed in the space between one side of the battery and the adjacent edge of the casing, one terminal of the lamp being grounded on the casing, a connection between the lamp and the battery, a yielding contact on the battery, a movable contact mounted on the casing and grounded thereon and adapted to engage the spring contact of the battery to close the circuit, and means for operating the movable contact.

2. A flash light comprising a metallic casing, a stem barrel fastened to the casing, a stem movable in the barrel and forming a switch contact, a knob on the outer end of the stem, a rectangular battery in the casing and having a contact adapted to be engaged by the stem, a lamp disposed in the casing between one side of the battery and the edge of the casing and having a terminal grounded on the latter, a contact engaging the other terminal of the lamp, and a ring attached to the barrel and forming a grip member.

3. A flash light comprising a metal circular casing, a lamp socket in the casing and electrically connected therewith, a lamp disposed in the socket and having one terminal grounded thereon, a rectangular battery in the casing and having one terminal connected with the other terminal of the lamp, the lamp being disposed in the space between one side of the battery and the edge of the casing, a switch including a movable contact element grounded on the casing and 10.6 arranged to engage the other terminal of the battery, and means for operating the movable element of the switch, said battery comprising a plurality of cell units connected in series, and each unit including a metallic casing element, a covering of insulation for the cell units, said covering having an opening exposing one of the casing elements at a point intermediate its ends for forming a terminal.

4. A flash light comprising a casing, a cover hingedly mounted thereon, a spring acting on the cover for throwing the same open, a catch on the casing and engaging the cover for holding the same closed, a battery disposed in the casing, there being a space between one side of the battery and the adjacent peripheral portion of the casing, a lamp positioned in the said space having one terminal grounded on the casing and the other terminal grounded on the battery and a circuit closing means operated by the catch when releasing the cover for electrically connecting the casing and battery to complete the circuit of the lamp.

5. A flash light having an external appearance like a closed watch, a casing, a stem barrel, a stem in the barrel, a spring acting on the stem, a ring attached to the barrel to form a means for holding the watch, a knob on the stem, and means on the ring for engaging the knob to hold the stem pressed inwardly against the tension of the spring, a battery in the casing and having a terminal with which the stem engages when pressed in, a lamp in the casing and having its terminals connected with the battery and casing respectively, whereby current flows through the lamp when the stem is pressed inwardly, a cover for the casing, means tending to throw the cover open, and a catch on the stem for releasing the cover when the stem is pressed inwardly.

6. A flash light comprising a metallic casing shaped like a watch, a rectangular battery disposed therein and provided with appropriate contact terminals, a lamp disposed in the space between one side of the battery and the adjacent edge of the casing, one terminal of the lamp being grounded on the casing, a connection between the lamp and the battery, a movable contact mounted on the casing and grounded thereon and adapted to engage one terminal of said battery to close circuit through the lamp, and means for operating said movable contact.

In testimony whereof I have signed my name to this specification.

HARRY M. KORETZKY.

Copies of this patent may be obtained for five cents each, by addressing the "Commissioner of Patents, Washington, D. C."